US012776305B2

(12) United States Patent
Wang et al.

(10) Patent No.: US 12,776,305 B2
(45) Date of Patent: Oct. 27, 2026

(54) ADVANCED CLUSTERING FOR SELF-SUPERVISED LEARNING IN SPEECH RECOGNITION

(71) Applicants: MICROSOFT TECHNOLOGY LICENSING, LLC, Redmond, WA (US); Yiming Wang, Bellevue, WA (US); Chengyi Wang, Beijing (CN); Jinyu Li, Bellevue, WA (US); Yu Wu, Beijing (CN); Shujie Liu, Beijing (CN)

(72) Inventors: Yiming Wang, Bellevue, WA (US); Chengyi Wang, Beijing (CN); Jinyu Li, Bellevue, WA (US); Yu Wu, Beijing (CN); Shujie Liu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 153 days.

(21) Appl. No.: 18/838,867

(22) PCT Filed: Mar. 24, 2022

(86) PCT No.: PCT/CN2022/082664
§ 371 (c)(1),
(2) Date: Aug. 15, 2024

(87) PCT Pub. No.: WO2023/178583
PCT Pub. Date: Sep. 28, 2023

(65) Prior Publication Data

US 2025/0157459 A1 May 15, 2025

(51) Int. Cl.
*G10L 15/06* (2013.01)
*G10L 15/16* (2006.01)

(52) U.S. Cl.
CPC ............ *G10L 15/063* (2013.01); *G10L 15/16* (2013.01)

(58) Field of Classification Search
None
See application file for complete search history.

(56) References Cited

U.S. PATENT DOCUMENTS 12,499,879 B1 * 12/2025 Soliman ................ G06F 40/295
2016/0247501 A1 * 8/2016 Kim ......................... G06N 7/01
(Continued)

OTHER PUBLICATIONS

Hsu (Hsu WN, Bolte B, Tsai YH, Lakhotia K, Salakhutdinov R, Mohamed A. Hubert: Self-supervised speech representation learning by masked prediction of hidden units. IEEE/ACM transactions on audio, speech, and language processing. Oct. 26, 2021;29:3451-60.) (Year: 2021).*
(Continued)

*Primary Examiner* — Jonathan C Kim
(74) *Attorney, Agent, or Firm* — Workman Nydegger

(57) ABSTRACT

Systems and methods are provided for generating a pseudo-labeled training dataset by at least one of: (1) extracting a set of intermediate outputs from an automatic speech recognition model based on applying the automatic speech recognition model to the set of unlabeled speech data, clustering the set of intermediate outputs into different clusters, and generating a first set of pseudo-labels comprising cluster assignments associated with the different clusters and which correspond to the unlabeled speech data, or (2) generating a set of decoded word sequences for the unlabeled speech data by applying the automatic speech recognition model to the set of unlabeled speech data, and generating a second set of pseudo-labels associated with the unlabeled speech data by applying the automatic speech recognition model to both (i) the set of decoded word sequences and (ii) the set of unlabeled speech data.

15 Claims, 8 Drawing Sheets

(56) References Cited

U.S. PATENT DOCUMENTS

| | | | | |
|---|---|---|---|---|
| 2019/0287515 | A1* | 9/2019 | Li | G06N 20/00 |
| 2020/0334538 | A1* | 10/2020 | Meng | G10L 15/063 |
| 2023/0078698 | A1* | 3/2023 | Shnarch | G06F 40/279 704/9 |
| 2023/0352029 | A1* | 11/2023 | Zhang | G10L 15/30 |
| 2025/0157459 | A1* | 5/2025 | Wang | G10L 15/16 |

OTHER PUBLICATIONS

Xu (Xu Q, Baevski A, Likhomanenko T, Tomasello P, Conneau A, Collobert R, Synnaeve G, Auli M. Self-training and pre-training are complementary for speech recognition. InICASSP 2021-2021 IEEE International Conference on Acoustics, Speech and Signal Processing (ICASSP) Jun. 6, 2021 (pp. 3030-3034). IEEE.) (Year: 2021).*

Pratap V, Hannun A, Xu Q, Cai J, Kahn J, Synnaeve G, Liptchinsky V, Collobert R. Wav2letter++: A fast open-source speech recognition system. InICASSP 2019-2019 IEEE International Conference on Acoustics, Speech and Signal Processing (ICASSP) May 12, 2019 (pp. 6460-6464). IEEE. (Year: 2019).*

Cai, et al., "An Iterative Framework for Self-Supervised Deep Speaker Representation Learning", IEEE_2021, pp. 6728-6732.

Chen, et al., "WavLM: Large-Scale Self-Supervised Pre-Training for Full Stack Speech Processing", arXiv:2110.13900, Jun. 17, 2022, 14 pages.

Devlin, et al., "BERT: Pre-training of Deep Bidirectional Transformers for Language Understanding", In Proceedings of NAACL-HLT, Jun. 2019, pp. 4171-4186.

Hsu, et al., "HuBERT: Self-Supervised Speech Representation Learning by Masked Prediction of Hidden Units", arXiv:2106.07447, Jun. 14, 2021, 10 pages.

International Search Report and Written Opinion Issued in PCT Application No. PCT/CN2022/082664, Aug. 19, 2022, 13 pages.

Wang, et al., "Self-Supervised Learning for speech recognition with Intermediate layer supervision", arXiv:2112.08778, Dec. 16, 2021, 8 pages.

Xiao, et al., "Contrastive Semi-Supervised Learning for ASR", IEEE, 2021, pp. 3870-3874.

Communication pursuant to Article 94(3) received in European Application No. 22718572.5, mailed on Jul. 15, 2025, 05 pages.

Communication pursuant to Article 94(3) received in European Application No. 22718572.5, mailed on Dec. 22, 2025, 06 pages.

Office Action Received for Chinese Application No. 202280053345.6, mailed on May 9, 2026, 15 pages (English Translation Provided).

* cited by examiner

ADVANCED CLUSTERING FOR SELF-SUPERVISED LEARNING IN SPEECH RECOGNITION

BACKGROUND

Automatic speech recognition (ASR) systems and other speech processing systems are used to process and decode audio data to detect speech utterances (e.g., words, phrases, and/or sentences). The processed audio data is then used in various downstream tasks such as search-based queries, speech to text transcription, language translation, etc. Training an automatic speech recognition system typically requires a large amount of labeled speech data. Thus, the need to collect a large amount of transcribed data has been a long-lasting problem, especially for low resource domains and languages. Recently, self-supervised learning (SSL) has emerged as a paradigm to tackle this problem. SSL for speech tasks leverages unlabeled data to learn contextual representations from input speech. Previous work has been done to train machine learning models by masking input text tokens conditioned on the rest of the input sequence.

However, this method does not directly apply with most speech signals because unlike text tokens, speech tokens are continuous-valued sequences that are not easily used as predictive targets. This is because there is no explicit boundary in the speech signals that can be used to segment speech into linguistically meaningful segments. In some approaches, pseudo labels have been used to train the ASR models. However, some models, such as Hidden Unit Bidirectional Encoder Representations from Transformers (HuBERT) that can utilize pseudo labels, require performing two or more stages of iterative training. This is because the pseudo label quality is somewhat limited in accuracy and must undergo one or more several rounds of pre-training to improve the accuracy of the pseudo labeling and/or pseudo-label trained models. In view of the foregoing, there is an ongoing need for improved systems and methods for generating pseudo-labeled training data for training ASR models.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Disclosed embodiments include systems, methods, and devices for generating pseudo-labeled training data from unlabeled training data and for using the pseudo-labeled training data pre-training speech processing models. Some disclosed systems are also configured to generate a pre-trained speech processing model by applying the pseudo-labeled training data to the speech processing model.

Disclosed embodiments include systems and methods that are configured to access a set of unlabeled speech data and generate pseudo-labels for the unlabeled speech data. In some instances, the pseudo-labels are generated by extracting a set of intermediate outputs from an automatic speech recognition model based on applying the automatic speech recognition model to the set of unlabeled speech data. The systems are configured to cluster the set of intermediate outputs into different clusters. Each cluster of the different clusters comprises a different sub-set of the set of intermediate outputs. The systems then generate a first set of pseudo-labels which comprises cluster assignments associated with the different clusters, and which correspond to the unlabeled speech data.

Additionally, or alternatively, the systems generate the pseudo-labels by generating a set of decoded word sequences for the unlabeled speech data by applying the automatic speech recognition model to the set of unlabeled speech data. The systems then generate a second set of pseudo-labels associated with the unlabeled speech data by applying the automatic speech recognition model to both (i) the set of decoded words sequences and (ii) the set of unlabeled speech data. Subsequent to generating the first or second set of pseudo-labels, the systems generate a pseudo-labeled training dataset by combining the set of unlabeled speech data with either (i) the first set of pseudo-labels or (ii) the second set of pseudo-labels.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be limiting in scope, embodiments will be described and explained with additional specificity and detail through the use of the accompanying drawings in which.

DETAILED DESCRIPTION

Figure 1:
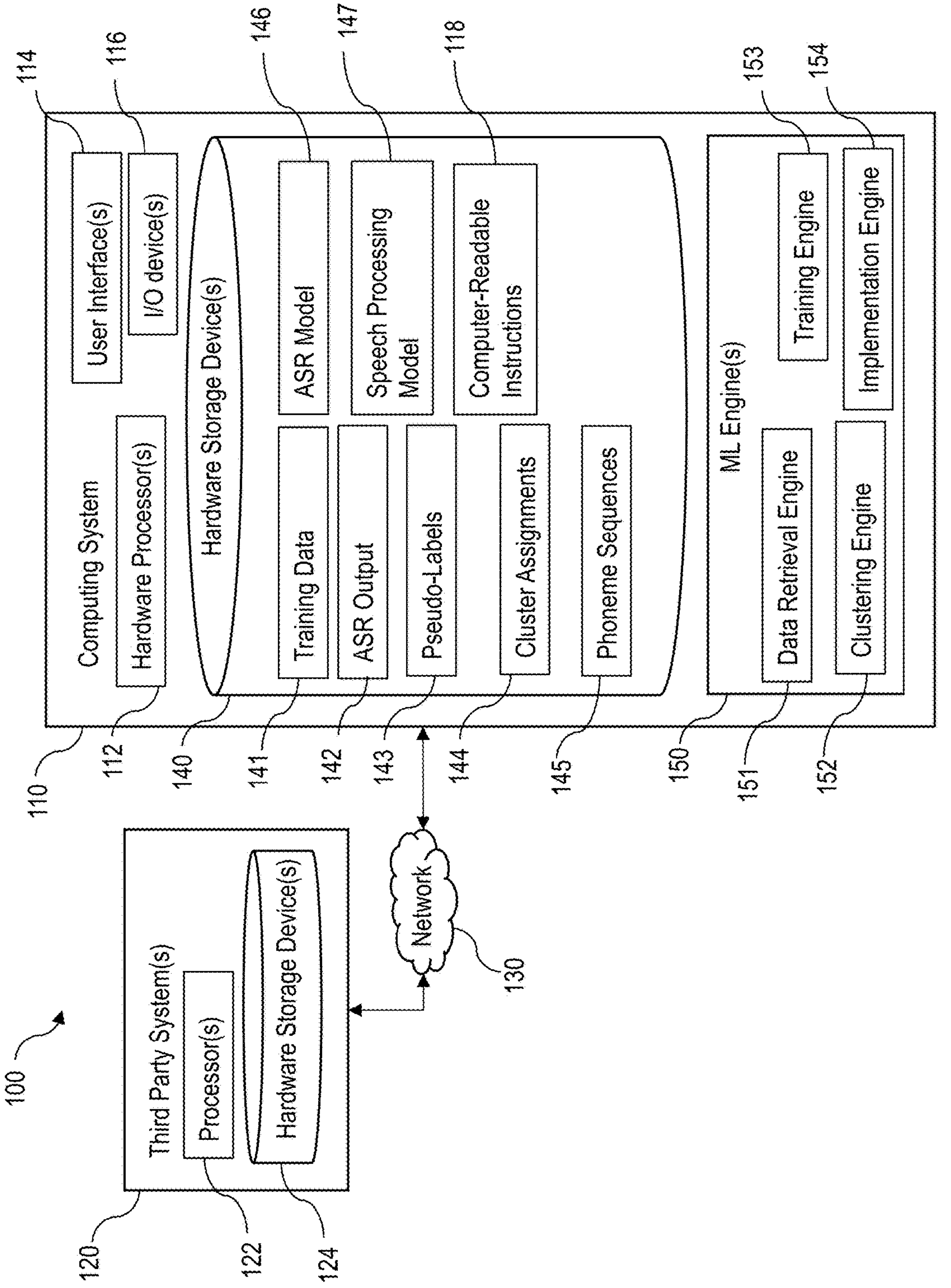
FIG. 1 illustrates a computing environment in which a computing system incorporates and/or is utilized to perform disclosed aspects of the disclosed embodiments.

Disclosed embodiments are directed towards improved systems, methods, and frameworks for generating a pseudo-labeled training dataset configured to pre-train a speech processing model or, in other words, prepare the speech processing model to be further fine-tuned using labeled training data. The disclosed embodiments also include systems and methods for generating a pre-trained speech processing model and fine-tuning the pre-trained speech processing model.

In this regard, it will be appreciated that some of the disclosed embodiments are specifically directed to improved systems and methods for generating pseudo-labels, including generating pseudo-labels comprising cluster assignments and/or generating pseudo-labels comprising phoneme sequences.

The disclosed embodiments provide many technical advantages over existing systems. For example, self-supervised learning beneficially leverages unlabeled data with a self-supervised loss in a pre-training stage where it is capable of learning good contextual representations from input speech. Pseudo-labels are used along with the unlabeled speech data during pre-training of the speech processing model. The pseudo-labels are used as targets for masked prediction which allows the model to learn meaningful continuous latent representations and speech contextual information from unmasked portion of speech input. In some instances, where clustering is used to generate the pseudo-labels, the pseudo labels provide consistent information about the underlying acoustic and language content across different speech examples. Pseudo labels generated from the ASR configurations described herein also provide corresponding consistent information used for the model(s).

Compared to pure unsupervised methods, well-trained ASR systems, either hybrid ASR systems or end-to-end ASR systems, provide improved means for generating more relevant and reliable pseudo-labels. The disclosed embodiments realize these benefits by utilizing well-trained ASR system in generating the pseudo-labels. Specifically, hybrid models yield more interpretable clusters, as they are built with explicit acoustic and language units with different levels of granularity, e.g., words, phonemes, and HMM states, etc.

Given a decoding graph composed of the acoustic model, the pronunciation model, and a language model, systems obtain frame-level assignments of the units (i.e., frame-level alignments for unlabeled speech). These can then be used as targets during training with self-supervised loss. Since hybrid ASR systems generate relevant and reliable frame-level alignments of speech, a single round of pre-training suffices to provide a well pre-trained model for later-fine tuning. This is a significant improvement over conventional methods described above which require several rounds of pre-training to generate a well-prepared model that can then be effectively and accurately fine-tuned.

Disclosed embodiments are also directed to generating pseudo-labels using end-to-end ASR models, which also provide technical advantages over conventional methods for generating pseudo labels. For example, in end-to-end systems (e.g., CTC systems), although there is no explicit modeling of clusters, the end-to-end ASR model is able to generate alignments between frames and labels which are effectively used in generating pseudo-labeled training data. In particular, the hidden representations (or embeddings) extracted from an intermediate layer of the neural network in an end-to-end system are very informative as they are trained to preserve content useful for ASR tasks.

Attention will now be directed to FIG. 1, which illustrates components of a computing system 110 which may include and/or be used to implement aspects of the disclosed invention. As shown, the computing system includes a plurality of machine learning (ML) engines, models, neural networks, and data types associated with inputs and outputs of the machine learning engines and models.

Attention will be first directed to FIG. 1, which illustrates the computing system 110 as part of a computing environment 100 that also includes third-party system(s) 120 in communication (via a network 130) with the computing system 110. The computing system 110 is configured to generate a pseudo-labeled training dataset configured to be used in pre-training a speech processing model. The computing system 110 is also configured to generate a pre-trained speech processing model which has been prepared, through the pre-training process, for further fine-tuning.

The computing system 110, for example, includes one or more processor(s) (such as one or more hardware processor(s) 112) and a storage (i.e., hardware storage device(s) 140) storing computer-readable instructions 118 wherein one or more of the hardware storage device(s) 140 is able to house any number of data types and any number of computer-readable instructions 118 by which the computing system 110 is configured to implement one or more aspects of the disclosed embodiments when the computer-readable instructions 118 are executed by the one or more processor(s) 112. The computing system 110 is also shown including user interface(s) 114 and input/output (I/O) device(s) 116.

As shown in FIG. 1, hardware storage device(s) 140 is shown as a single storage unit. However, it will be appreciated that the hardware storage device(s) 140 is, a distributed storage that is distributed to several separate and sometimes remote systems and/or third-party system(s) 120. The computing system 110 can also comprise a distributed system with one or more of the components of computing system 110 being maintained/run by different distributed systems that are remote from each other and that each perform different tasks. In some instances, a plurality of distributed systems performs similar and/or shared tasks for implementing the disclosed functionality, such as in a distributed cloud environment.

The storage (e.g., hardware storage device(s) 140) includes computer-readable instructions 118 for instantiating or executing one or more of the models and/or engines shown in computing system 110. The models are configured as machine learning models or machine learned models, such as deep learning models and/or algorithms and/or neural networks. In some instances, the one or more models are configured as engines or processing systems (e.g., computing systems integrated within computing system 110), wherein each engine comprises one or more processors (e.g., hardware processor(s) 112) and computer-readable instructions 118 corresponding to the computing system 110. In some configurations, a model is a set of numerical weights embedded in a data structure, and an engine is a separate piece of code that, when executed, is configured to load the model, and compute the output of the model in context of the input data.

The hardware storage device(s) 140 are configured to store and/or cache in a memory store the different data types including training data 141, ASR output 142, pseudo-labels 143, cluster assignments 144, and phoneme sequences 145, described herein.

The training data 141 includes sets of unlabeled data which comprise unlabeled speech data and sets of labeled data which comprise speech data and corresponding speech transcription data (e.g., text data) which are labels for the speech data. In either type of set of training data, the speech data can be synthesized speech data, processed speech data, and/or raw speech data. For raw speech data, natural language audio is obtained from a plurality of locations and applications. In some instances, natural language audio is extracted from previously recorded files such as video recordings having audio or audio-only recordings. Some examples of recordings include videos, podcasts, voicemails, voice memos, songs, etc.

Natural language audio is also extracted from actively streaming content which is live continuous speech such as a news broadcast, phone call, virtual or in-person meeting, etc. In some instances, a previously recorded audio file is streamed. Natural audio data comprises spoken language utterances without a corresponding clean speech reference signal. Natural audio data is recorded from a plurality of sources, including applications, meetings comprising one or more speakers, ambient environments including background noise and human speakers, etc. It should be appreciated that the natural language audio comprises one or more spoken languages of the world's spoken languages.

In some instances where the speech data is synthesized speech data, the speech data is created from the text data using a text-to-speech system. Simulated/synthesized audio data comprises a mixture of simulated clean speech (e.g., clean reference audio data) and one or more of: room impulse responses, isotropic noise, or ambient or transient noise for any particular actual or simulated environment or one that is extracted using text-to-speech technologies. Thus, parallel clean audio data and noisy audio data is generated using the clean reference audio data on the one hand, and a mixture of the clean reference audio data and background noise data. Simulated noisy speech data is also generated by distorting the clean reference audio data. The processed speech data can be post-processed synthesized speech data or raw speech data that has been subsequently processed and/or filtered.

The sets of labeled training data comprise transcription data and natural language audio and/or simulated audio that comprises speech utterances corresponding to words, phrases, and sentences included in the text data. In other words, the transcription data are the ground truth output for the speech utterances. The text or transcription data comprises sequences of characters, symbols, and/or number extracted from a variety of sources. For example, the text data comprises text message data, contents from emails, newspaper articles, webpages, books, mobile application pages, etc. In some instances, the characters of the text data are recognized using optical text recognition of a physical or digital sample of text data. Additionally, or alternatively, the characters of the text data are recognized by processing metadata of a digital sample of text data. In some instances, the transcription data is created from the speech data using a speech-to-text system.

The hardware storage device(s) 140 are also configured to store ASR output. The ASR output can be generated from any ASR system, beneficially from a hybrid ASR system and/or an end-to-end ASR system. In some instances, the ASR output is an intermediate output which has been extracted from an intermediate layer of the ASR system. In such instances, the intermediate output comprises hidden layer representations or embeddings. Additionally, or alternatively, the ASR output is a final output which is generated from a final layer of the ASR system or the recognition stage of the ASR system. In such instances, the ASR output comprises word sequences corresponding to input speech data. The ASR output is generated from applying the ASR model to unlabeled speech data.

The ASR output is then used to generate pseudo-labels for the unlabeled speech data. In some instances, the pseudo-labels are based on cluster assignments generated by the clustering engine 152. In some instances, the pseudo-labels comprise phoneme sequences that were generated as a secondary ASR output by reapplying the ASR model to a combination of (i) the previously generated word sequences and (ii) the unlabeled speech data.

The hardware storage device(s) 140 are configured to store and/or cache in a memory store the different machine learning models. For example, the computing system 110 stores and/or access an ASR model 146, which is configured to perform automatic speech recognition tasks. The ASR model is a hybrid system and/or an end-to-end system. The computing system 110 also stores and/or accesses a speech processing model 147. In some instances, the speech processing model is an acoustic model based on a BERT-like or HuBERT-like model, or other type of transformer-based speech processing model.

An additional storage unit for storing machine learning (ML) Engine(s) 150 is presently shown in FIG. 1 as storing a plurality of machine learning models and/or engines. For example, computing system 110 comprises one or more of the following: a data retrieval engine 151, a clustering engine 152, a training engine 153, and an implementation engine 154, which are individually and/or collectively configured to implement the different functionality described herein.

The computing system also is configured with a data retrieval engine 151, which is configured to locate and access data sources, databases, and/or storage devices comprising one or more data types from which the data retrieval engine 151 can extract sets or subsets of data to be used as training data (e.g., training data 141). The data retrieval engine 151 receives data from the databases and/or hardware storage devices, wherein the data retrieval engine 151 is configured to reformat or otherwise augment the received data to be used in the automatic speech recognition tasks. Additionally, or alternatively, the data retrieval engine 151 is in communication with one or more remote systems (e.g., third-party system(s) 120) comprising third-party datasets and/or data sources. In some instances, these data sources comprise audio-visual services that record or stream text, images, and/or video. The data retrieval engine 151 is configured to retrieve text data and/or speech data in real-time, such that the data is "streaming" and being processed in real-time.

The data retrieval engine 151 accesses electronic content comprising text data and/or other types of audio-visual data including video data, image data, holographic data, 3-D image data, etc. The data retrieval engine 151 is a smart engine that is able to learn optimal dataset extraction processes to provide a sufficient amount of data in a timely manner as well as retrieve data that is most applicable to the desired applications for which the machine learning models/engines will be used.

The data retrieval engine 151 locates, selects, and/or stores raw recorded source data wherein the data retrieval engine 151 is in communication with one or more other ML engine(s) and/or models included in computing system 110. In such instances, the other engines in communication with the data retrieval engine 151 are able to receive data that has been retrieved (i.e., extracted, pulled, etc.) from one or more data sources such that the received data is further augmented and/or applied to downstream processes. For example, the data retrieval engine 151 is in communication with the training engine 153 and/or implementation engine 154.

The computing system is configured with a clustering engine 152 which is configured to apply a clustering algorithm to intermediate ASR output to generate a plurality of clusters. The clustering engine 152 is also configured to generate a clustering assignment for each cluster of the plurality of clusters. These clustering assignments are generated at various granularities, including at a frame-level. The clustering assignments are then used as pseudo-labels for unlabeled speech data to generate a pseudo-labeled training data set.

The training engine 153 is configured to train the ASR model, including training the ASR model with labeled data and/or unlabeled data. The training engine 153 is also configured to pre-train the speech processing model with pseudo-labeled training data. Additionally, the training engine 153 is configured to fine-tune the speech processing model with labeled data.

The computing system 110 includes an implementation engine 154 in communication with any one of the models and/or ML engine(s) 150 (or all of the models/engines) included in the computing system 110 such that the implementation engine 154 is configured to implement, initiate, or run one or more functions of the plurality of ML engine(s) 150. In one example, the implementation engine 154 is configured to operate the data retrieval engine 151 so that the data retrieval engine 151 retrieves data at the appropriate time. The implementation engine 154 facilitates the process communication and timing of communication between one or more of the ML engine(s) 150 and is configured to implement and operate a machine learning model (or one or more of the ML engine(s) 150).

The computing system is in communication with third-party system(s) 120 comprising one or more processor(s) 122, one or more of the computer-readable instructions 118, and one or more hardware storage device(s) 124. It is anticipated that, in some instances, the third-party system(s) 120 further comprise databases housing data that could be used as training data, for example, text data not included in local storage. Additionally, or alternatively, the third-party system(s) 120 include machine learning systems external to the computing system 110. The third-party system(s) 120 are software programs or applications.

Figure 2:
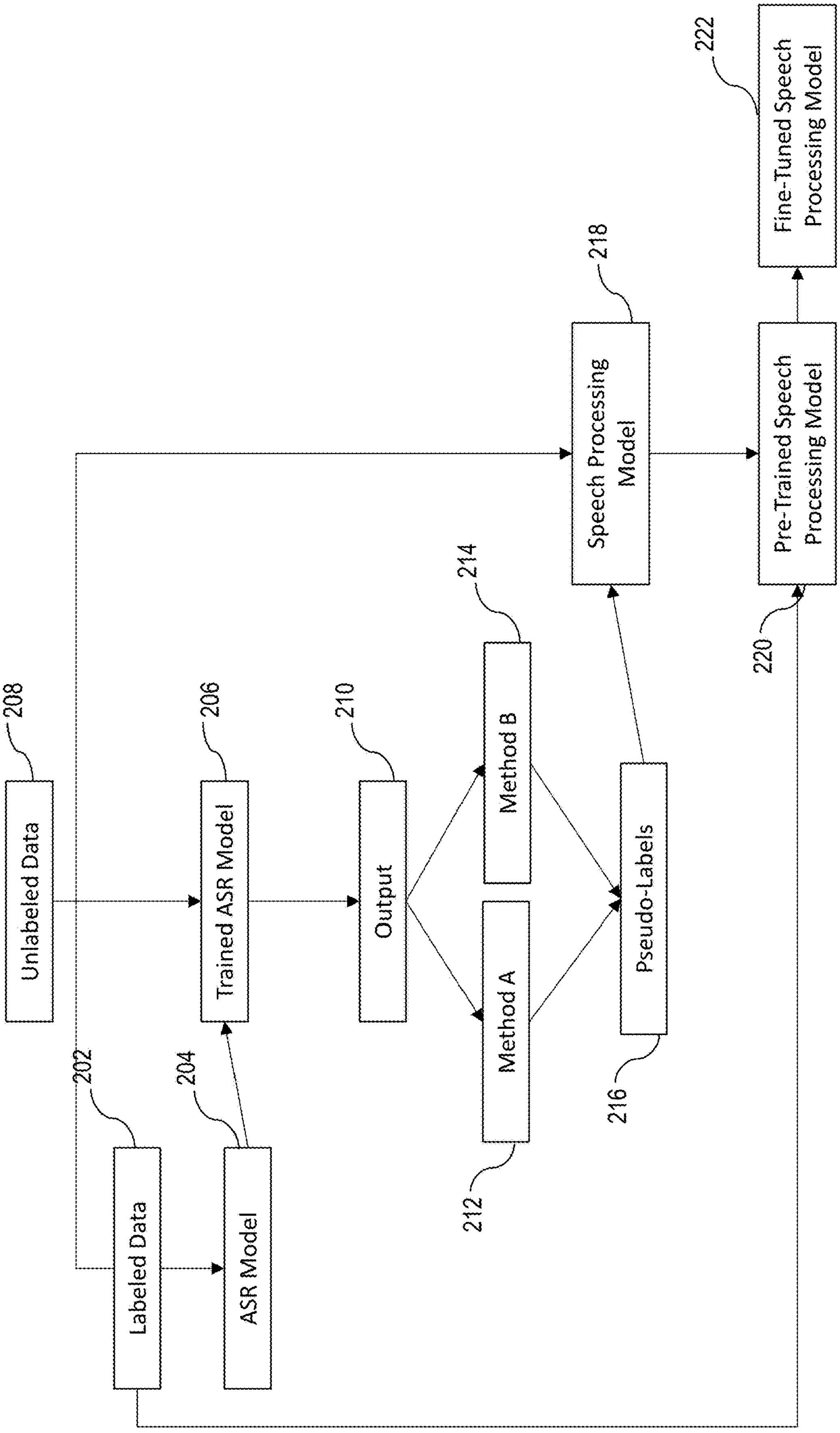
FIG. 2 illustrates an example embodiment of a process flow diagram for generating a pre-trained speech processing model with pseudo-labeled training data which can be further fine-tuned using labeled training data.

Attention will now be directed to FIG. 2, which illustrates an example embodiment of a process flow diagram for generating a pre-trained speech processing model with pseudo-labeled training data which can be further fine-tuned using labeled training data. First, an ASR model 204, e.g., ASR model 146, is trained on labeled data 202, wherein a trained ASR model 206 is generated. The trained ASR model 206 then receives unlabeled data 208 as input data and generates an output 210. The output 210 is configurable as an intermediate output and/or a final output. Depending on the type of output, either method A 212 or method B 214 is applied to process the output 210 to generate pseudo-labels 216.

The speech processing model 218 (which may be an untrained speech processing model) is then applied to both the pseudo-labels 216 and the unlabeled data 208. The pseudo-labels 216 correspond to speech utterances in the unlabeled data 208 and together form a pseudo-labeled training dataset which is used to pre-train the speech processing model. The pre-trained speech processing model 220 can then be further trained (e.g., fine-tuned) using labeled data 202. In some instances, the labeled data used to fine-tune the pre-trained speech processing model 220 is the same set or sub-set of the same set of labeled data used to train the ASR model. Alternatively, the labeled data used to fine-tune the pre-trained speech processing model is a different set of labeled data. In either configuration, a fine-tuned speech processing model 222 is generated.

Figure 3:
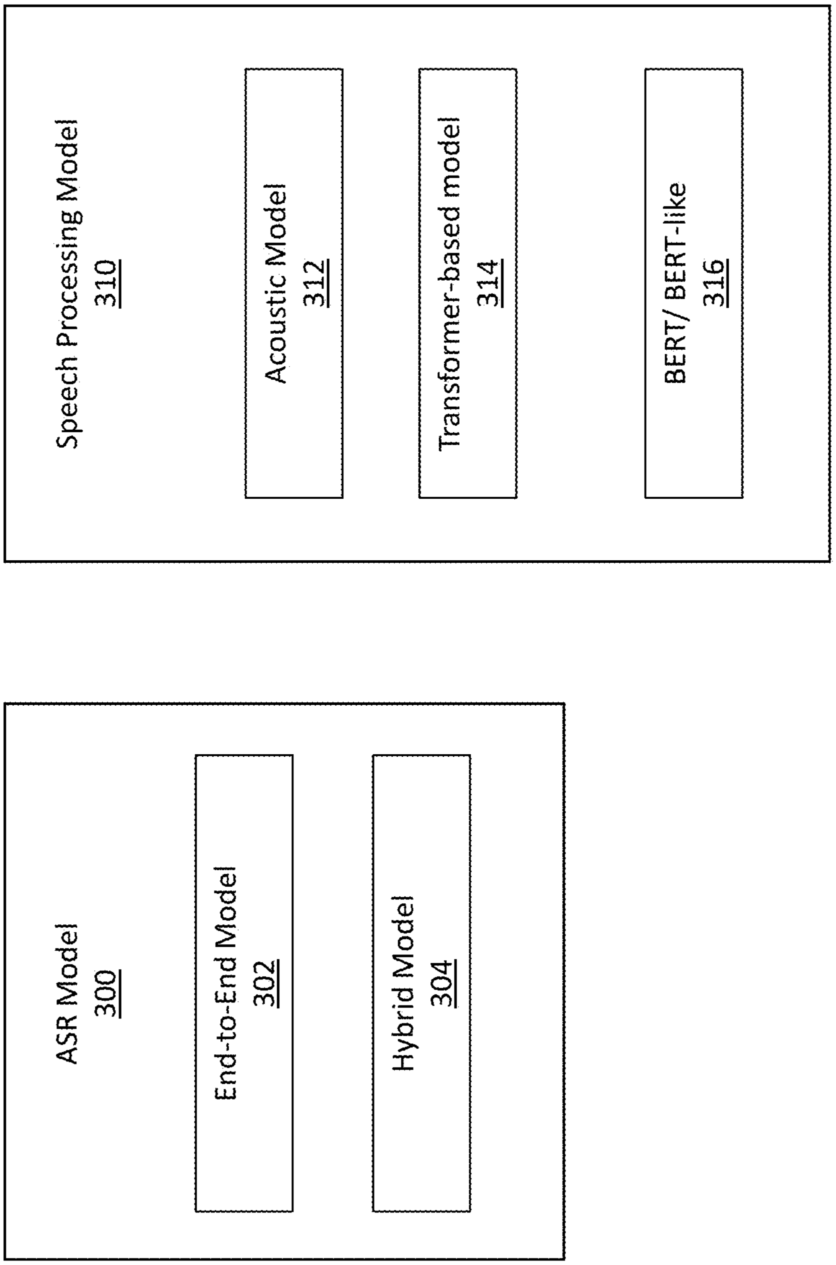
FIG. 3 illustrates different example embodiments of various components as depicted in FIG. 2, including an ASR model and a speech processing model.

Attention will now be directed to FIG. 3, which illustrates different example embodiments of various components as depicted in FIG. 2, including an ASR model and a speech processing model. For example, the ASR model 300, which is representative of ASR model 204, is shown being configurable as an end-to-end model 302 or hybrid model 304. Additionally, speech processing model 310, which is representative of speech processing model 218, is shown being configurable as an acoustic model 312, a transformer-based model 314, and/or a BERT/BERT-like model 316.

Figure 4:
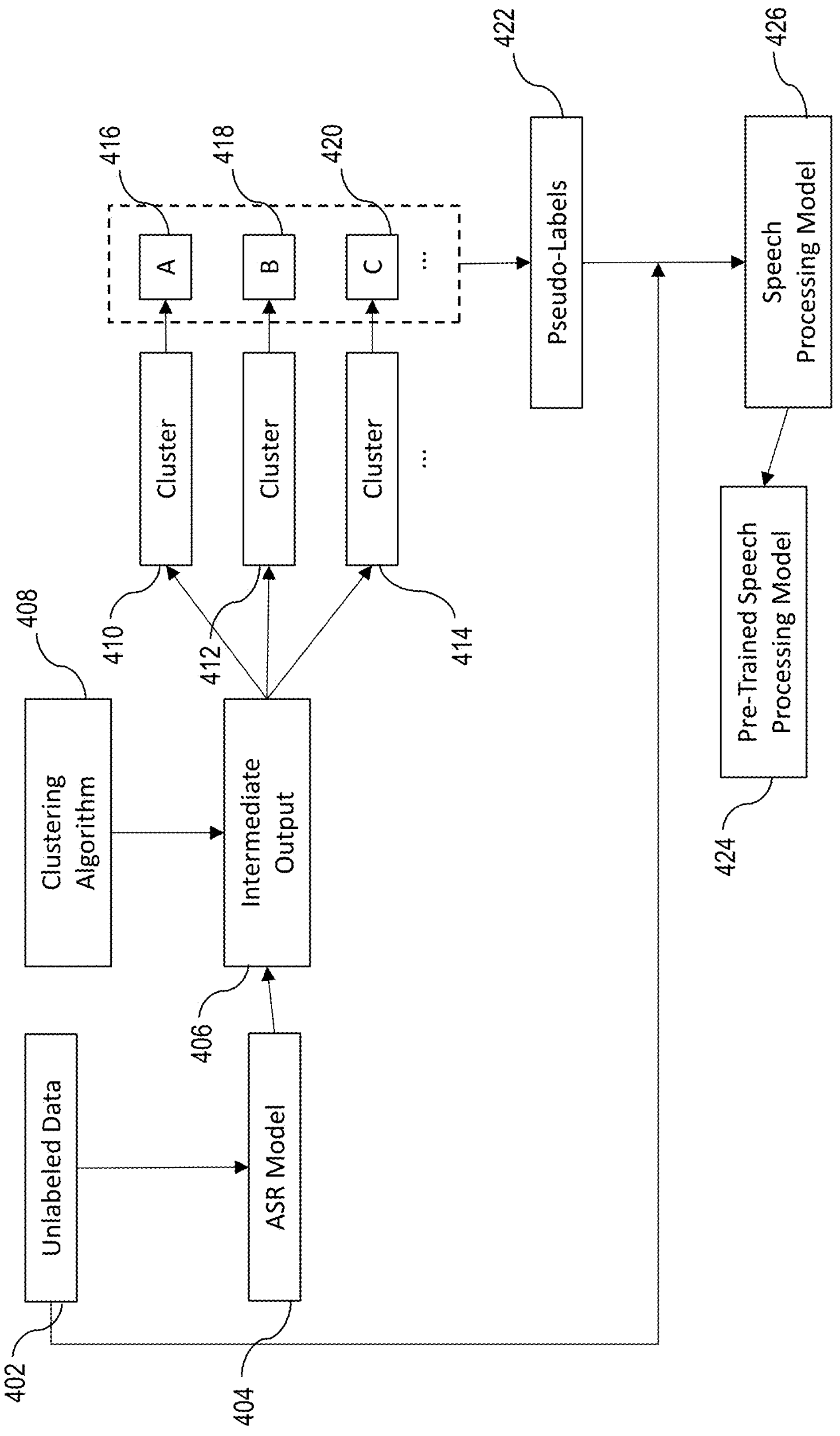
FIG. 4 illustrates an example embodiment of generating pseudo-labels from clustering intermediate outputs of an automatic speech recognition model.

Attention will now be directed to FIG. 4, which illustrates an example embodiment of generating pseudo-labels from clustering intermediate outputs of an automatic speech recognition model (e.g., applying method A 212 as shown in FIG. 2). For example, an ASR model 404, which is representative of ASR model 300, is shown being applied to unlabeled data 402. In some instances, the ASR model 404 is a trained ASR model. In some instances, the ASR model is a CTC ASR model (e.g., a type of end-to-end ASR model). Alternatively, any supervised machine learning model can be used in generating the pseudo-labels when the supervised machine learning model is configured to extract meaningful frame-level hidden representations with the supervised information during the training process.

By using a trained ASR model which has been trained in a supervised manner (e.g., with labeled data), the ASR model retains more ASR-related information in its hidden layer embeddings compared to unsupervised trained ASR models. Thus, applying a clustering algorithm on embeddings extracted from supervised trained ASR model yield more information-rich clusters, even if the labeled speech data is less than the unlabeled speech data when being used to learn speech embeddings. A second technical benefit is realized in that training the ASR model in a supervised manner is faster than training a model with the same architecture and same amount of speech data in an unsupervised way.

An intermediate output 406 is generated as output from an intermediate layer of the ASR model 404. A clustering algorithm 408 is then applied to the intermediate output to generate a plurality of clusters (e.g., cluster 410, cluster 412, cluster 414, and one or more additional clusters). A plurality of cluster assignments is then generated (e.g., cluster assignment 416, cluster assignment 418, cluster assignment 420, and one or more additional cluster assignments). A cluster assignment is generated for each cluster included in the plurality of clusters. For example, label "A" is assigned to cluster 410, label "B" is assigned to cluster 412, label "C" is assigned to cluster 414, and one or more additional labels are assigned to any additional clusters.

Each cluster comprises a sub-set of the intermediate output 406. The cluster assignments are generated at a frame-level associated with the unlabeled data 402. The cluster assignments are then used as pseudo-labels 422. The pseudo-labels 422 based on the cluster assignments and the unlabeled data 402 form a pseudo-labeled training dataset.

The speech processing model 426 is then applied to the pseudo-labeled training dataset, such that the system generates a pre-trained speech processing model 424. The pre-trained speech processing model 424 is prepared, through the pre-training process, to be further trained and/or fine-tuned with additional training data.

Figure 5:
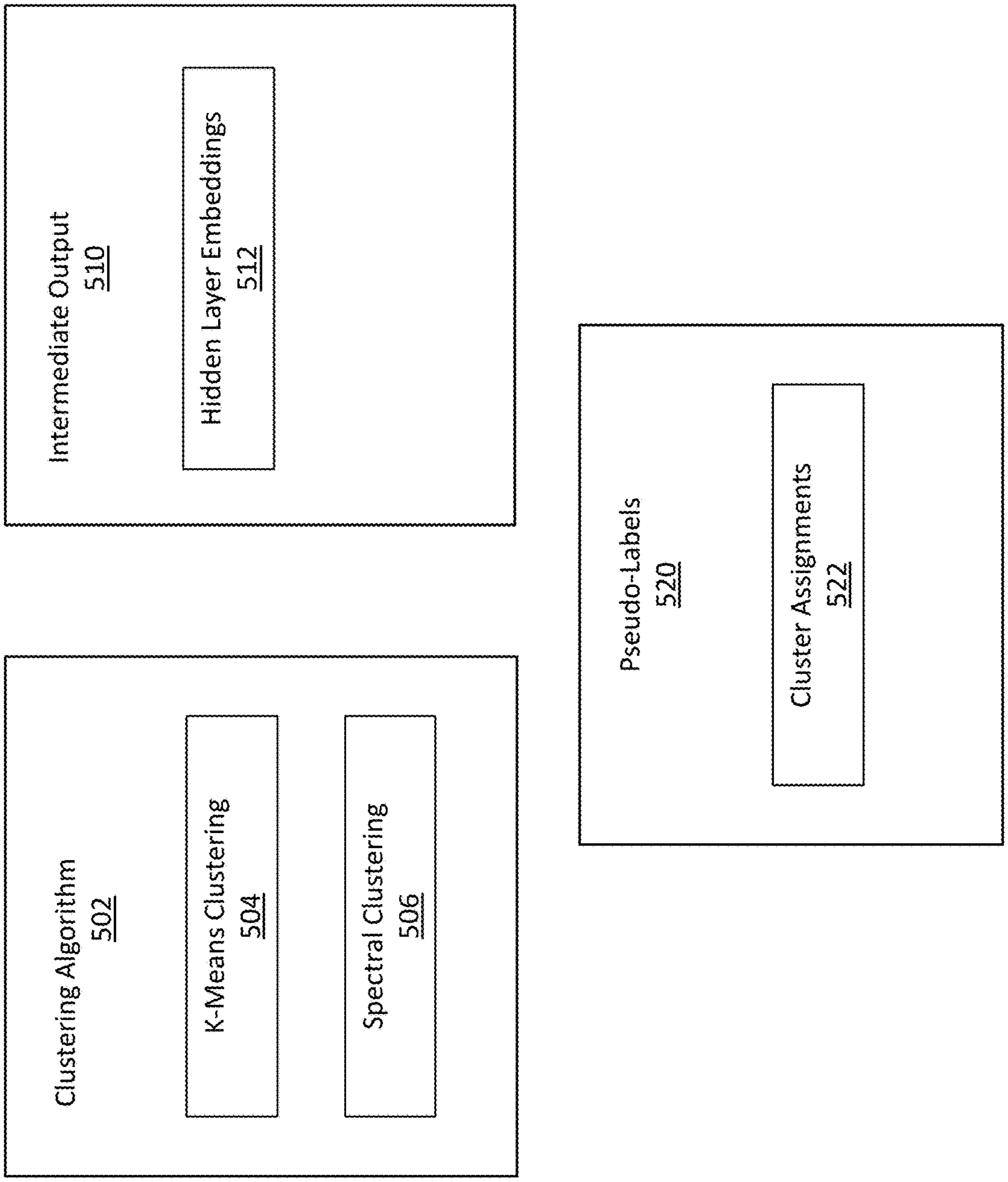
FIG. 5 illustrates different example embodiments of various components as depicted in FIG. 4, including clustering algorithms, intermediate outputs, and pseudo-labels.

Attention will now be directed to FIG. 5, which illustrates different example embodiments of various components as depicted in FIG. 4, including clustering algorithm 502, representative of clustering algorithm 408, intermediate outputs 510 representative of intermediate output 406, and pseudo-labels 520 representative of pseudo-labels 422. For example, the clustering algorithm 502 is configurable as any clustering algorithm configured to process ASR output and cluster the output into one or more different clusters. In some instances, the clustering algorithm is a K-means clustering 504 or a spectral clustering 506. Additionally, the intermediate output 510 is configurable as a set of intermediate layer representations. While the ASR model comprises one or more hidden layers, the intermediate output 510 comprises hidden layer embeddings 512 to which the clustering algorithm 502 is applicable. In such configurations, the pseudo-labels 520 comprise cluster assignments 522 generated for each of the clusters.

Figure 6:
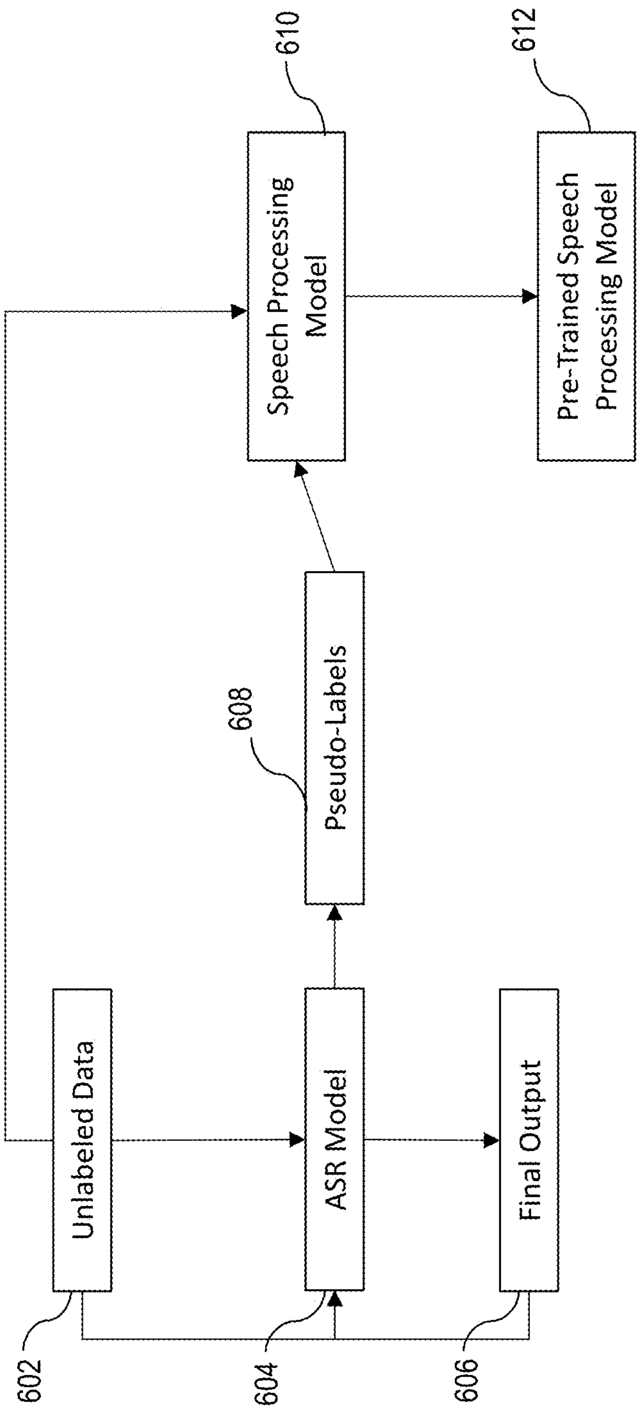
FIG. 6 illustrates an example embodiment of generating pseudo-labels by re-processing a final output of an automatic speech recognition model.

Attention will now be directed to FIG. 6, which illustrates an alternate exemplary embodiment of generating pseudo-labels, specifically by re-processing a final output of an automatic speech recognition model (e.g., method B 214 as depicted in FIG. 2). For example, an ASR model 604, which is configured in some instances as an end-to-end ASR model, is applied to a set of unlabeled data 602. A final output 606 is generated as output from the ASR model 604. The ASR model 604, if it is a hybrid model, is then re-applied to a combination of the final output 606 and the unlabeled data 602 to generate a new output which is the basis for the generation of pseudo-labels 608 corresponding to speech utterances in the unlabeled data 602. In some instances (e.g., if 604 is an end-to-end model), a second ASR model, which is a hybrid model, is applied to the combination of the final output 606 and the unlabeled data 602. A speech processing model 610 is then applied to a combination of the pseudo-labels 608 and the unlabeled data 602, wherein a pre-trained speech processing model 612 is generated.

In some training implementations, the unlabeled data 602 comprises under one thousand hours of unlabeled speech data for pre-training and one hundred hours of labeled data for fine-tuning. Such pre-trained speech processing models that are subsequently fine-tuned achieve a WER reduction (WERR) between 13.4% and 15.5%, which is better than conventional speech processing models.

Additional technical benefits are realized using this method of pre-training. For example, the systems can leverage more masking strategies than conventional systems (e.g., pure unsupervised HuBERT models) given the availability of the frame-level alignments (e.g., the phoneme sequences generated at a frame-level associated with the unlabeled data). In conventional HuBERT pre-training, frames within several randomly sampled windows of certain fixed length from an utterance are masked out, with the starting position of each window being uniformly sampled. Spans of these windows are possibly being overlapped with each other. In contrast, disclosed embodiments are directed to a speech processing model and training method that can leverage boundary information of the acoustic or linguistic units from the alignments. Because of this boundary information, which is not available in conventional methods, the systems are able to perform phoneme or word-based masking (i.e., the span of a mask window coincides with the span of a phoneme or a word).

This masking technique is a much more accurate and efficient method of training the model, as compared to conventional techniques that use arbitrary windows which may or may not align with the actual phonemes or words recognized in the input speech. Masking based on spans of phonemes or words will encode more contextual language information into the speech processing model than a simple random masking strategy where such unit boundaries are unknown. Since words and phonemes are not overlapped with each other in the alignments, there is no overlapping among different masks. Masks can also be applied depending on the specific phonemes or words, (e.g., the systems can leverage a strategy where masks are only applied to non-silence phonemes/words). This is beneficial because if a frame that only has silence is masked, then the model may try to predict a transcription token for a word that does not actually exist.

Figure 7:
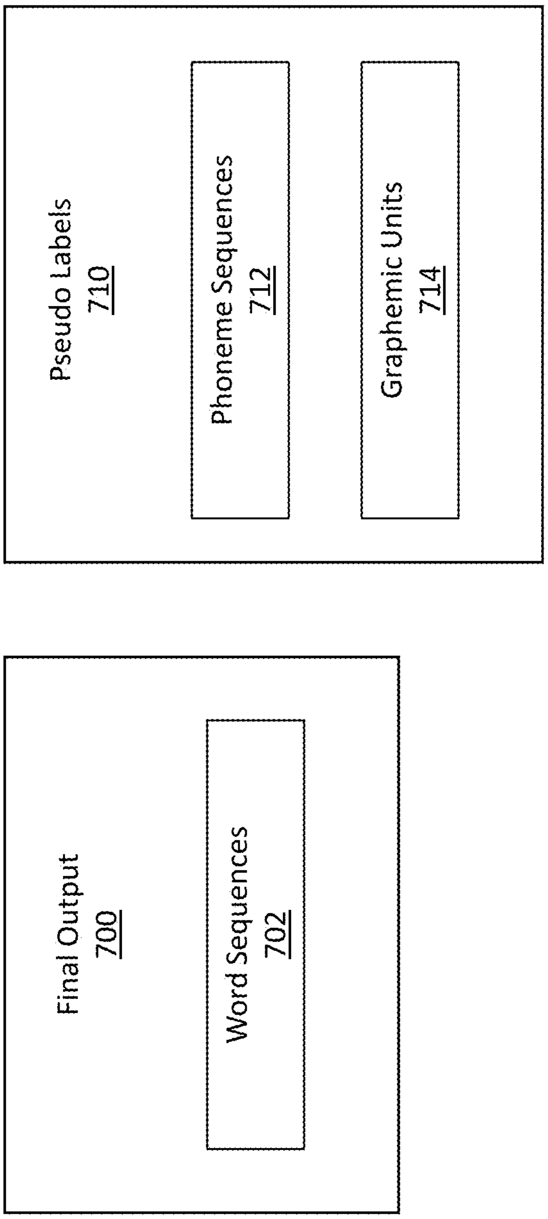
FIG. 7 illustrates different example embodiments of various components as depicted in FIG. 6, including final output and pseudo-labels.

Attention will now be directed to FIG. 7, which illustrates different example embodiments of various components as depicted in FIG. 6, including final output and pseudo-labels. For example, in some instances, the final output 700 comprises word sequences 702 that correspond to speech utterances recognized in the unlabeled data (e.g., unlabeled speech data). The word sequences are generated through a decoding process by the ASR model. In such configurations, the pseudo-labels 710 comprise phoneme sequences 712, which are generated at a frame-level associated with the unlabeled data. The frame-level phoneme sequences (e.g., phoneme alignments) are used as targets in self-supervised pre-training with a masked language model loss (e.g., like a HuBERT loss) for end-to-end ASR. These pseudo-labels correspond to the acoustic units defined in the hybrid ASR system (e.g., phonemes).

In other configurations, the pseudo-labels 710 comprises other types of acoustic and/or language prediction units such as graphemic units 714 which can be used to train a hybrid ASR system. Alternatively, if the systems are able to access a trained acoustic and/or linguistic unit classifier based on local and/or global speech acoustic features, the systems can directly leverage the unit classifier to generate the frame-level sequences for the speech input without performing an ASR decoding process.

Figure 8:
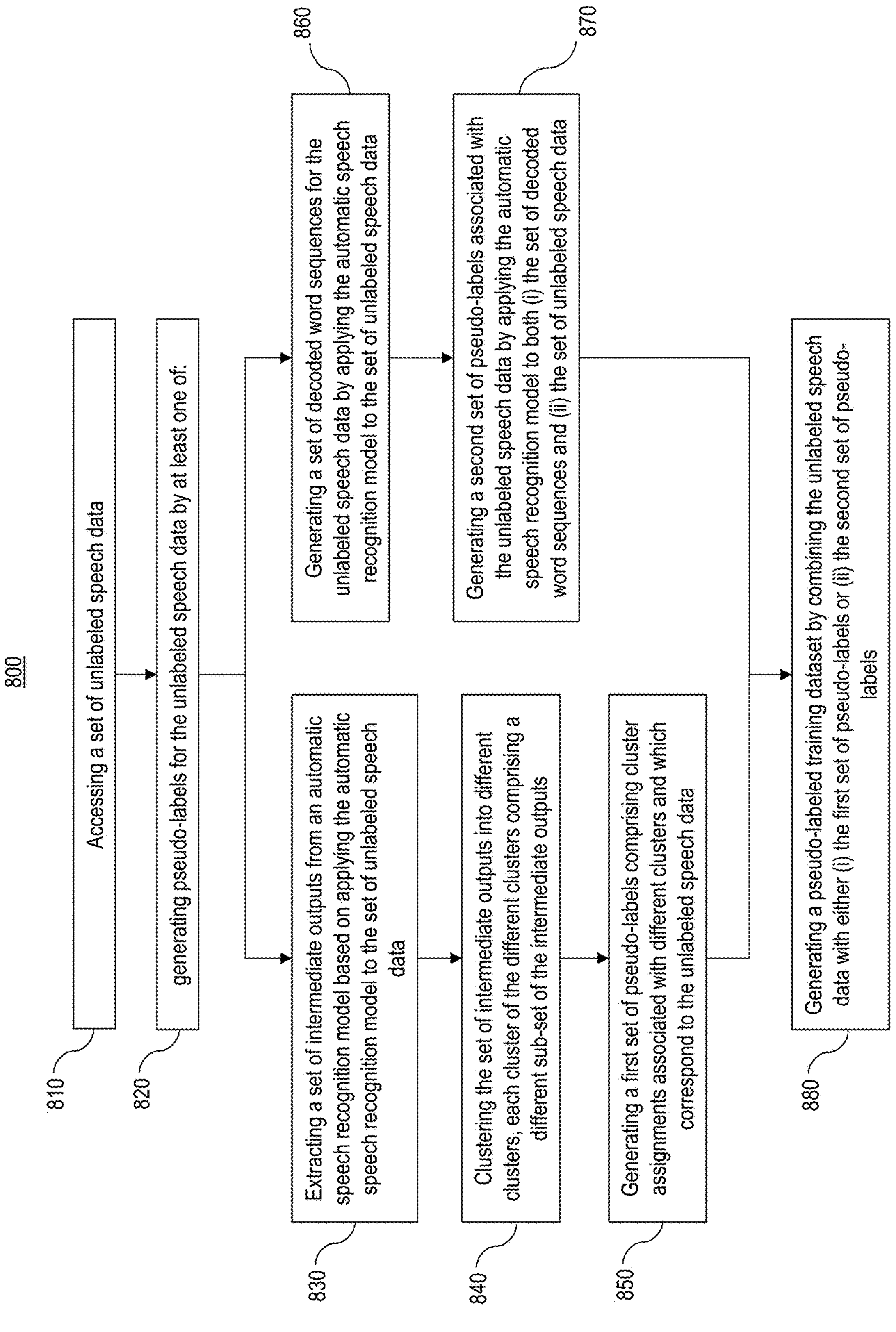
FIG. 8 illustrates one embodiment of a flow diagram having a plurality of acts for generating a pseudo-labeled training dataset configured to pre-train a speech processing model.

Attention will now be directed to FIG. 8 which illustrates a flow diagram 800 that includes various acts (act 810, act 820, act 830, act 840, act 850, act 860, act 870, and act 880) associated with exemplary methods that can be implemented by computing system 110 for generating a pseudo-labeled training dataset.

The first illustrated act includes an act of accessing a set of unlabeled speech data (act 810). The system then generates pseudo-labels for the unlabeled speech data (act 820) by one of two methods. In a first method, the pseudo-labels are generated by extracting a set of intermediate outputs from an automatic speech recognition model based on applying the automatic speech recognition model to the set of unlabeled speech data (act 830).

Next, the system clusters the set of intermediate outputs into different clusters (act 840). Each cluster of the different clusters comprises a different subset of the set of intermediate outputs. Because the embeddings (e.g., intermediate outputs) are extracted from a trained ASR model, rather than from precomputed features or a self-supervised pre-trained model, the embeddings contain more relevant acoustic and linguistic information. The quality of the clustering is improved because the clustering is performed on representations (e.g., the intermediate outputs) containing more ASR characteristics.

The system generates a first set of pseudo-labels comprising cluster assignments associated with the different clusters and which correspond to the unlabeled speech data (act 850). By using cluster assignments as pseudo-labels, this method of generating pseudo-labels beneficially requires less training time than conventional methods because the embeddings used to generate the pseudo-labels are obtained from a model in a supervised way, where supervised training requires less training time per training iteration and less training iterations (i.e., it only needs one iteration of pre-training).

Alternatively, the pseudo labels are generated by a different method. In such configurations, the pseudo-labels are generated by first generating a set of decoded word sequences for the unlabeled speech data by applying an automatic speech recognition model to the set of unlabeled speech data (act 860). Subsequently, a second set of pseudo-labels associated with the unlabeled speech data is generated by applying a hybrid automatic speech recognition model to both (i) the set of decoded word sequences and (ii) the set of unlabeled speech data (act 870).

In such a method of generating pseudo-labels, phonemes are obtained by decoding the speech with an existing ASR model and obtaining frame-level phoneme alignments from a hybrid ASR model as pseudo-labels. One advantage of these pseudo-labels is that the pseudo-labels are meaningful acoustic units which align well with the underlying acoustic and/or language units of the input speech. Another advantage is that there is no need to refine the pseudo-labels by running multiple rounds of pre-training. Instead, only one iteration of pre-training is required to obtain an effective and accurate pre-trained speech processing model. This saves time and computational energy when building ASR models that will use the speech processing model. This enables the system to encode more linguistic information into the learned representation.

Subsequent to generating the pseudo-labels through either method, the system generates a pseudo-labeled training dataset by combining the unlabeled speech data with either (i) the first set of pseudo-labels or (ii) the second set of pseudo-labels (act 880). After the pseudo-labeled training dataset is generated, a speech processing model can be applied to the pseudo-labeled training data by which process the system is configured to generate a pretrained speech processing model. Through this pre-training process, the pre-trained speech processing model is prepared to be trained with labeled speech data (e.g., fine-tuned with labeled speech data) with only one round of pre-training.

Once the pre-trained speech processing model is generated, it can be further trained or fine-tuned. For example, disclosed embodiments are also directed to systems and methods for generating a trained speech processing model by at least applying labeled training data to the pretrained speech processing model to fine-tune the speech processing model.

In some instances, the automatic speech recognition model used in generating the pseudo-labels is previously trained on the labeled training data used to fine-tune the pre-trained speech processing model. Alternatively, the automatic speech recognition model is previously trained on a different set of labeled speech data than the labeled training data used to fine-tune the speech processing model. In this manner, the labeled training data may be associated with a new domain or language to which the speech processing model is being adapted.

The pseudo-labels may comprise different acoustic and/or linguistic representation units. In some instances, the second set of pseudo-labels comprises phoneme sequences, wherein the phoneme sequences are generated at a frame level. When phoneme sequence alignments are available to the system during training, the method includes training the speech processing model by at least performing phoneme-based masking to the pseudo-labeled training dataset. Alternatively, the second set of phoneme units comprises graphemic units.

The availability of phoneme/word boundary information makes it possible to perform masking where each mask corresponds to the span of a whole phoneme or whole word during pretraining. It enables the system to apply masks for a particular sub-set of phonemes/words, which is not possible in conventional methods of pretraining (e.g., as in prior art HuBERT) due to the lack of such linguistic unit information.

When pseudo-labels are generated from clustering the intermediate output, clustering the set of intermediate outputs comprises applying one of: a K-means clustering algorithm to the set of intermediate outputs or a spectral clustering algorithm, or any other applicable clustering algorithm. In such configurations, the cluster assignments are generated at a frame level. The set of intermediate outputs comprise hidden layer embeddings associated with one or more hidden layers of the automatic speech recognition model. The automatic speech recognition model used in generating the pseudo-labels is configurable as an end-to-end automatic speech recognition model or a hybrid automatic speech recognition model.

Although not shown in FIG. 8, the disclosed methods also include using pseudo-labels generated with the aforementioned novel techniques to pretrain or refine training of a speech processing model for improving accuracy and/or efficiency of the speech processing model in performing a speech processing task (e.g., ASR, speaker recognition, speech separation tasks, transcription processing, language translation, or any other speech processing tasks). In particular, for example, it should be appreciated that the disclosed embodiments for generating pseudo-labels provide for more efficient training of speech processing models, such as acoustic models that are used in building ASR systems, than is possible with conventional techniques. Furthermore, the generation of such pseudo labels helps to further improve self-supervised learning methods, especially for domains that have limited labeled training data (e.g., low resource languages).

Additionally, the foregoing processing for generating pseudo-labels can also be used for generating training data for other types of machine learning/learnable models, other than speech processing models, to facilitate pretraining of the machine learning/learnable models with training data other than traditional supervised labeled training data.

Example Computing Systems

Embodiments of the present invention may comprise or utilize a special purpose or general-purpose computer (e.g., computing system 110) including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media (e.g., hardware storage device (s) 140 of FIG. 1) that store computer-executable instructions (e.g., computer-readable instructions 118 of FIG. 1) are physical hardware storage media/devices that exclude transmission media. Computer-readable media that carry computer-executable instructions or computer-readable instructions (e.g., computer-readable instructions 118) in one or more carrier waves or signals are transmission media. Thus, by way of example, and not limitation, embodiments of the invention can comprise at least two distinctly different kinds of computer-readable media: physical computer-readable storage media/devices and transmission computer-readable media.

Physical computer-readable storage media/devices are hardware and include RAM, ROM, EEPROM, CD-ROM or other optical disk storage (such as CDs, DVDs, etc.), magnetic disk storage or other magnetic storage devices, or any other hardware which can be used to store desired program code means in the form of computer-executable instructions or data structures and which can be accessed by a general purpose or special purpose computer.

A "network" (e.g., network 130 of FIG. 1) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry, or desired program code means in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for generating pseudo-labeled training data from unlabeled training data, the method comprising:

accessing a set of unlabeled speech data;

generating pseudo-labels for the set of unlabeled speech data by at least:

(1) extracting a set of intermediate outputs from an automatic speech recognition model based on applying the automatic speech recognition model to the set of unlabeled speech data, clustering the set of intermediate outputs into different clusters, each cluster of the different clusters comprising a different sub-set of the set of intermediate outputs, and generating a first set of pseudo-labels comprising cluster assignments associated with the different clusters and which correspond to the set of unlabeled speech data, and (2) generating a set of decoded word sequences for the set of unlabeled speech data by applying the automatic speech recognition model to the set of unlabeled speech data, and generating a second set of pseudo-labels associated with the set of unlabeled speech data by applying a hybrid automatic speech recognition model that comprises an acoustic model, a pronunciation model, and a language model to both (i) the set of decoded word sequences and (ii) the set of unlabeled speech data to generate frame-level alignments for the set of unlabeled speech data; and generating a pseudo-labeled training dataset by combining the set of unlabeled speech data with (i) the first set of pseudo-labels and (ii) the second set of pseudo-labels.

2. The method of claim 1, further comprising:

generating a pretrained language speech model by at least applying the pseudo-labeled training dataset to a speech processing model for preparing the speech processing model to be trained with labeled speech data.

3. The method of claim 2, wherein the speech processing model is an acoustic model.

4. The method of claim 2, further comprising:

generating a trained speech processing model by at least applying labeled training data to the pretrained speech processing model to fine-tune the speech processing model; and using the trained speech processing model to perform at least one of speech recognition, speaker recognition or a speech separation task.

5. The method of claim 4, wherein the automatic speech recognition model is previously trained on the labeled training data.

6. The method of claim 4, wherein the automatic speech recognition model is previously trained on a different set of labeled speech data than the labeled training data.

7. The method of claim 2, wherein the second set of pseudo-labels comprises phoneme sequences generated as frame-level phoneme alignments by the hybrid automatic speech recognition model using the acoustic model, the pronunciation model, and the language model operating together as a decoding graph.

8. The method of claim 7, wherein training the speech processing model comprises applying masks selectively to non-silence phonemes in the pseudo-labeled training dataset based on the frame-level phoneme alignments.

9. The method of claim 8, wherein the method includes training the speech processing model by at least performing phoneme-based masking based on the frame-level phoneme alignments to the pseudo-labeled training dataset.

10. The method of claim 1, wherein the second set of pseudo-labels comprises graphemic units.

11. The method of claim 1, wherein clustering the set of intermediate outputs comprises applying one of: a K-means clustering algorithm to the set of intermediate outputs or a spectral clustering algorithm.

12. The method of claim 1, wherein the cluster assignments are generated at a frame level.

13. The method of claim 1, wherein the set of intermediate outputs comprises hidden layer embeddings associated with one or more hidden layers of the automatic speech recognition model.

14. The method of claim 1, wherein the method includes said generating pseudo-labels for the set of unlabeled speech data by:

extracting the set of intermediate outputs from the automatic speech recognition model, which is an end-to-end or hybrid automatic speech recognition model, based on applying the automatic speech recognition model to the set of unlabeled speech data, clustering the set of intermediate outputs into the different clusters, and generating the first set of pseudo-labels comprising cluster assignments associated with the different clusters, wherein the hybrid automatic speech recognition model used to generate the second set of pseudo-labels is a different model from the automatic speech recognition model used to generate the set of decoded word sequences.

15. A computing system configured for generating a pre-trained speech processing model using pseudo-labeled training data, the computing system comprising:

one or more processors; and one or more hardware storage devices storing one or more computer-executable instructions that are executable by the one or more processors to configure the computing system to at least:

access a set of unlabeled speech data;

generate pseudo-labels for the set of unlabeled speech data by at least:

(1) extracting a set of intermediate outputs from an automatic speech recognition model based on applying the set of unlabeled speech data to the automatic speech recognition model, clustering the set of intermediate outputs into different clusters, each cluster of the different clusters comprising a different sub-set of the set of intermediate outputs, and generating a first set of pseudo-labels comprising cluster assignments associated with the different clusters and which correspond to the set of unlabeled speech data, and (2) generating a set of decoded word sequences for the set of unlabeled speech data by applying the automatic speech recognition model to the set of unlabeled speech data, and generating a second set of pseudo-labels associated with the set of unlabeled speech data by applying a hybrid automatic speech recognition model that comprises an acoustic model, a pronunciation model, and a language model to both (i) the set of decoded word sequences and (ii) the set of unlabeled speech data to generate frame-level alignments for the set of unlabeled speech data; and generate a pseudo-labeled training dataset by combining the set of unlabeled speech data with (i) the first set of pseudo-labels and (ii) the second set of pseudo-labels.

* * * * *